United States Patent

Sheppard et al.

[11] Patent Number: 6,061,102
[45] Date of Patent: May 9, 2000

[54] AUTOMATIC SHADING IN AN LCLV PROJECTOR

[75] Inventors: John P. Sheppard, Valley Center; Rodney D. Sterling; Graeme D. Gow, both of Carlsbad; John J. Lyon, San Marcos, all of Calif.

[73] Assignee: Hughes-JVC Technology Corporation, Carlsbad, Calif.

[21] Appl. No.: 08/949,105

[22] Filed: Oct. 10, 1997

[51] Int. Cl.[7] .............................. H04N 3/223; H04N 9/28
[52] U.S. Cl. ......................... 348/745; 348/191; 348/658
[58] Field of Search ................................... 348/745–747, 348/744, 806, 807, 189, 190, 191, 658, 615; 315/368.12, 368.13; H04N 9/28, 9/31, 3/223, 3/227

[56] References Cited

U.S. PATENT DOCUMENTS 5,231,481  7/1993  Eouzan et al. ........................... 348/745
5,268,775  12/1993  Zeidler .
5,298,985  3/1994  Tsujihara et al. ........................ 348/807
5,345,262  9/1994  Yee et al. .
5,532,764  7/1996  Itaki ........................................ 348/745

*Primary Examiner*—Michael H. Lee
*Attorney, Agent, or Firm*—Harness, Dickey & Pierce, P.L.C.

[57] ABSTRACT

A process for implementing shading corrections in a video projector. The process selects a color to be shaded, and then sets a projector video level at a selected high video level. A target brightness map is then generated for each of a plurality of preselected shading correction application points at the selected high video level. The process sets the projector video level at a selected low video level, and generates a target brightness map for each of the plurality of shading correction application points at the low video level. Actual light levels are then measured at both the high and low video levels for each shading correction application point, and differences between the target and measured brightness values are minimized. The shading process of the present invention is automatically preformed during projector set-up, and thereby eliminates the inherent subjective and time consuming need for conventional manual shading processes.

21 Claims, 9 Drawing Sheets

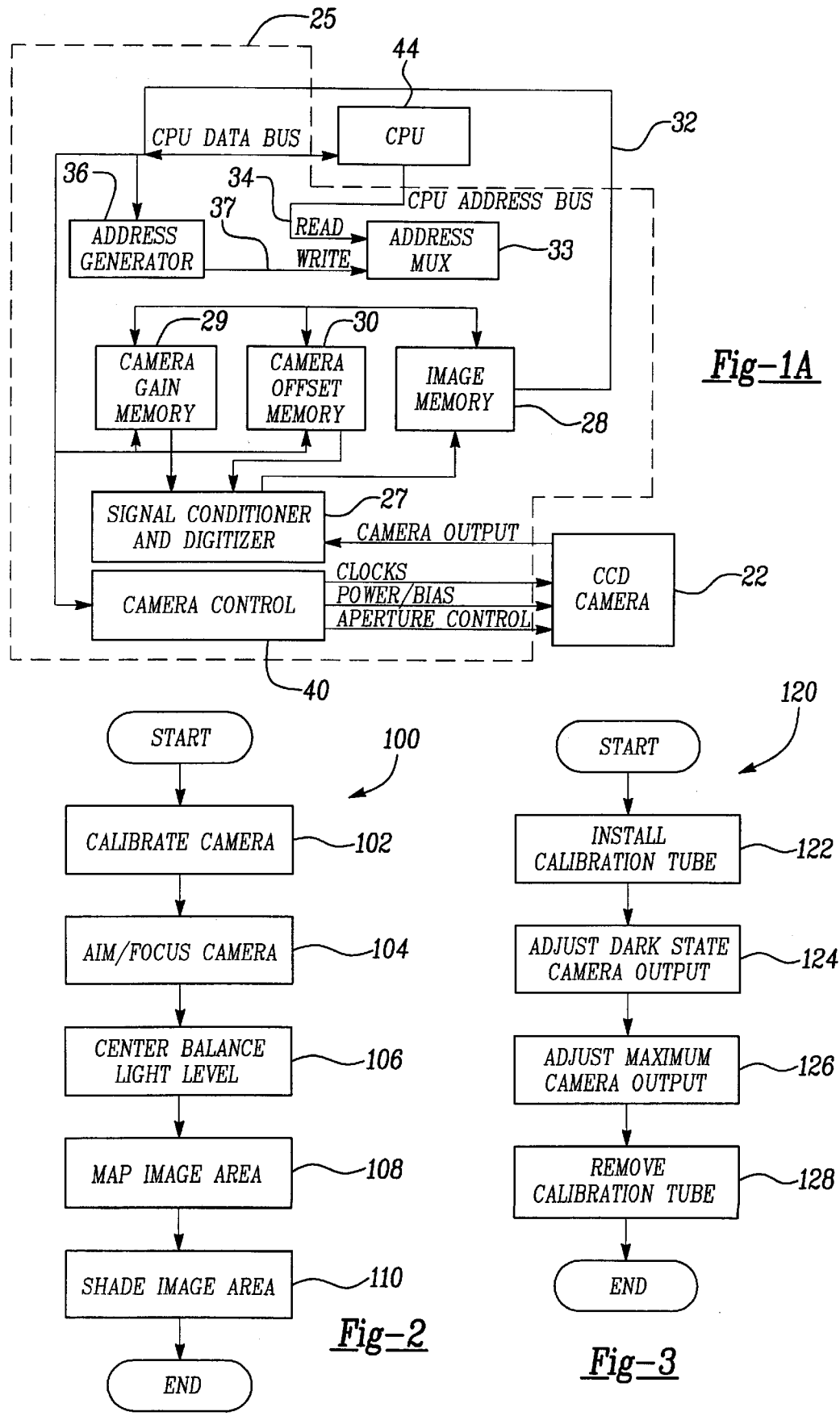

|  | LEFT EDGE | CENTER COLUMN | RIGHT EDGE | |
|---|---|---|---|---|
| TARGET | 43 | 51 | 47 | |
| IMAGE | 40 | 52 | 53 | TOP EDGE |
| CORRECTION | 113 | 105 | 111 | |
| TARGET | 62 | 150 | 65 | |
| IMAGE | 65 | 148 | 63 | CENTER ROW |
| CORRECTION | 125 | 115 | 112 | |
| TARGET | 49 | 57 | 48 | |
| IMAGE | 41 | 52 | 51 | BOTTOM EDGE |
| CORRECTION | 116 | 151 | 165 | |

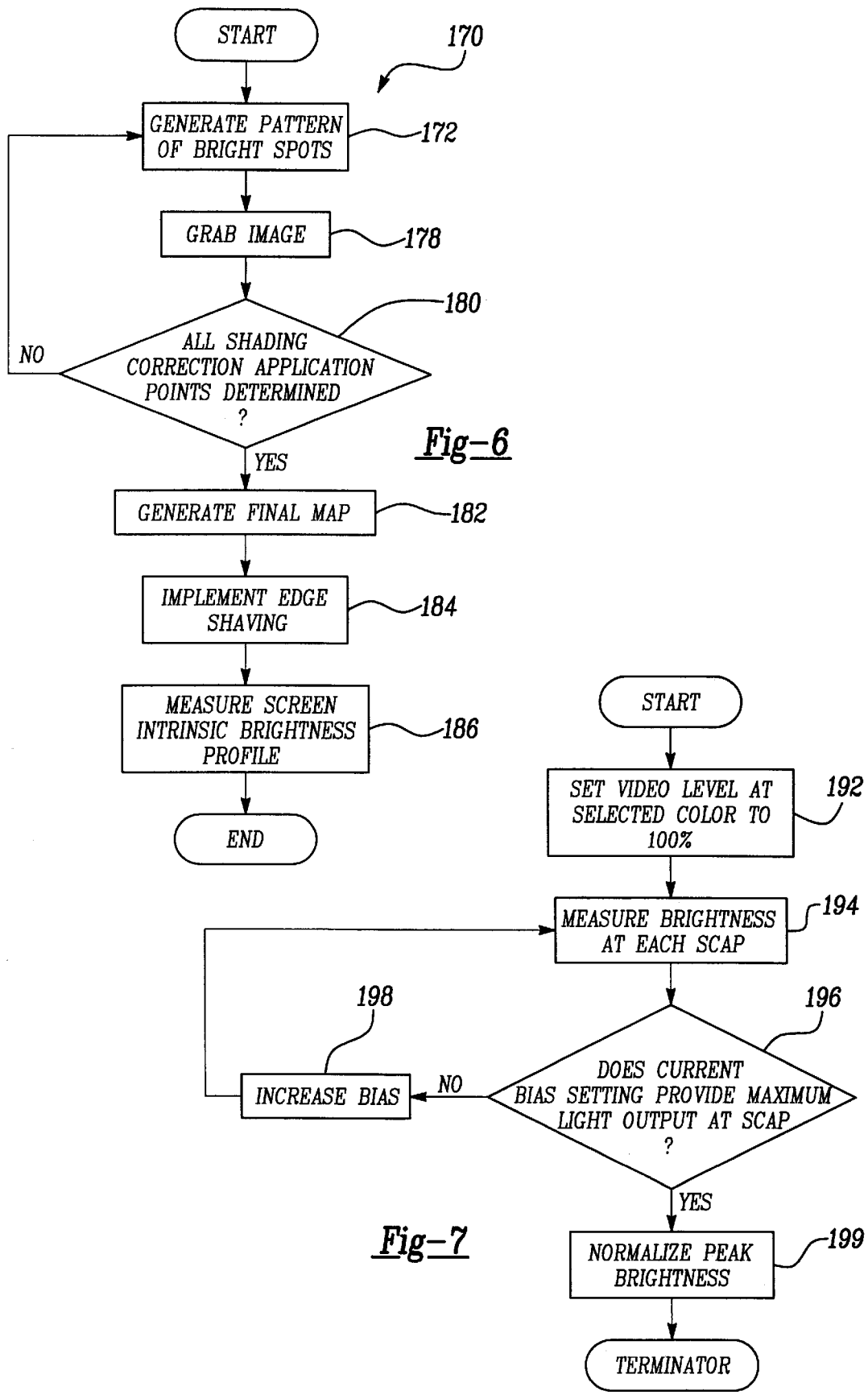

AUTOMATIC SHADING IN AN LCLV PROJECTOR

BACKGROUND OF THE INVENTION

1. Technical Field

The present invention relates generally to image projection systems, and more particularly to a system and associated methodology for providing automatic shading of sensed overbright portions of an image projected by an LCLV projector.

2. Discussion

Light amplification-based video projectors driven by video signals should ideally produce uniform light patterns. However, due to inherent variations in system parameters, such as light valve film thicknesses, these projectors often produce light patterns with associated nonuniformities. The nonuniformities are amplified by projector amplifiers before the resultant image is output through a projector lens. The amplified nonuniformities produce undesired light and dark areas in images projected by monochrome projectors, as well as undesirable colored or overbright areas in images projected by multi-channel projectors.

The conventional approach to correcting image nonuniformities involves manually adjusting the brightness of the projected images through shading controls associated with the projector. Projection controls associated with the projector are often difficult for an inexperienced operator to use. Even with an experienced operator, images projected from such a projector often exhibit shading errors as a result of the subjectivity introduced by the operator, as the operator must rely on his or her eyesight in adjusting the projector to correct the errors. As a result, not only does such a process require a long time to execute, but the resulting projected images have less than optimal shading characteristics.

SUMMARY OF THE INVENTION

Accordingly, the present invention provides a system, and corresponding shading routine, that automatically corrects for light intensity errors present in a projected image. The system senses the projected image and generates sensed image data in response. The data is then used to shade overbright image portions during projector set-up test. The system of the present invention thereby eliminates the inherent subjectivity associated with many conventional projector shading correction systems, as the projector operator need not use his or her eyesight to determine the amount of image shading correction.

More particularly, the present invention provides a video projector that receives and processes video signals and projects an image corresponding to the processed signals. The projector includes a plurality of video signal amplifiers that amplify the video signal prior to the video signal being output through the projector lens. A light intensity measurement device senses the intensity of light of the projected signal and in response generates light intensity error signals. A processor coupled to the light intensity measurement device receives the light intensity error signals and automatically adjusts the plurality of video signal amplifiers to compensate for the sensed light intensity errors.

In one preferred embodiment, the processor includes a plurality of light intensity maps stored in a digital memory. The maps are projected in a test pattern and sensed by the light intensity measurement device to produce correction maps. The processor generates these correction maps, and stores the maps in an associated memory. The processor subsequently reads the stored correction maps to produce image correction signals as an image is projected from the projector.

BRIEF DESCRIPTION OF THE DRAWINGS

FIG. 1A is a block schematic diagram of the camera circuitry shown in FIG. 1;

FIG. 2 is a flow diagram illustrating the overall methodology associated with an LCLV projector set-up, including the automatic shading method of the present invention;

FIG. 3 is a flow diagram of the methodology associated with calibrating the camera associated with the video projector;

FIG. 6 is a flow diagram of the methodology associated with mapping and image area prior to shading the image area;

FIG. 7 is a flow diagram of the methodology associated with measuring the intrinsic brightness profile of the display image screen, which is performed during mapping of the image area;

DETAILED DESCRIPTION OF THE PREFERRED EMBODIMENT

Figure 1:
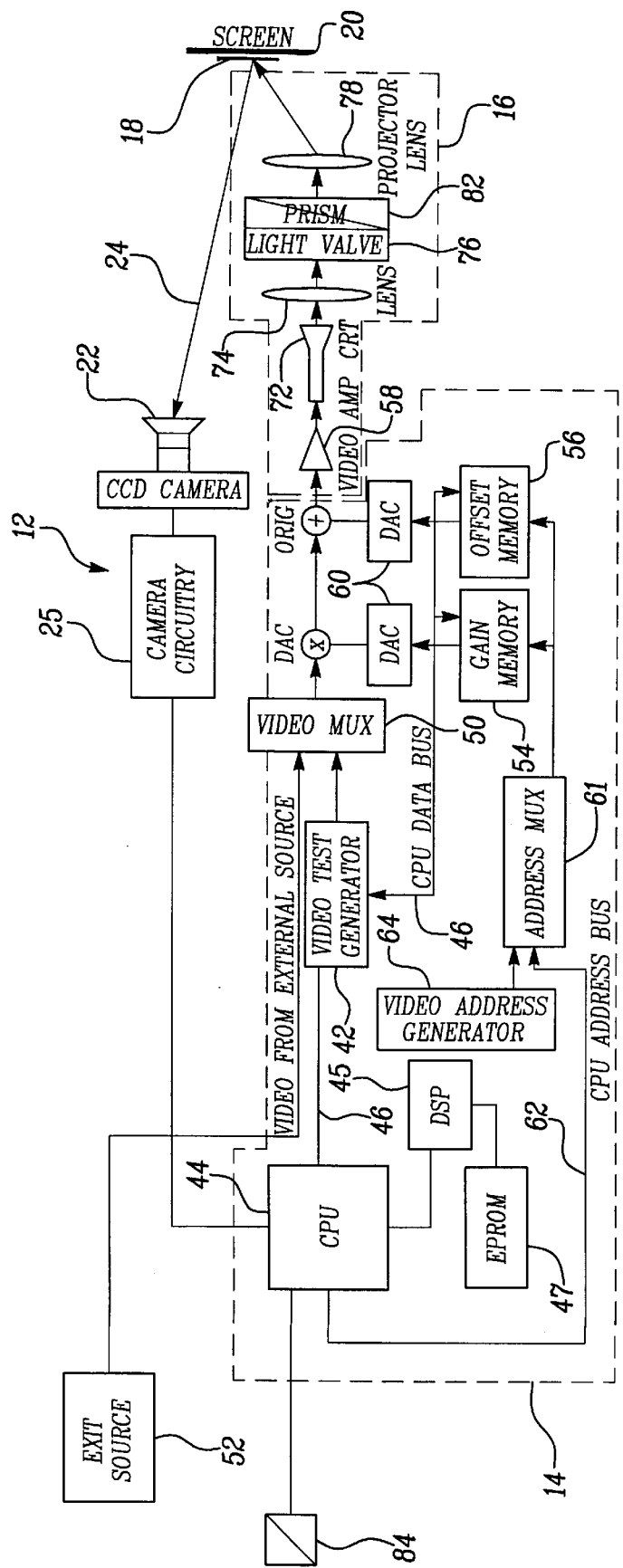
FIG. 1 is block schematic diagram of a video projector system incorporating the system and methodology of the present invention.

FIG. 1 illustrates a video projector system 10 incorporating an automatic shading routine according to a preferred embodiment. The routine logic, automatically corrects for light amplification and sensitivity variations, as well as cathode ray tube (CRT) radiance variations, thereby significantly reducing projector set-up time. The automatic shading routine reduces the requisite skill level required for operation of the projector, as well as eliminates subjectivity introduced into shading correction caused by adjustments made due to operator image visual inspection. The routine also improves the ability of the system to project an image with particular shading correction in a repeatable manner.

The system 10 includes a light sensor subsystem 12, video projector circuitry 14, and a video projector lens assembly 16. As described in more detail below, the projector circuitry processes an input video signal. The lens assembly projects an image 18 formed from the processed video signal onto a video screen 20. The light sensor device senses the image and automatically corrects light intensity errors associated with the projected image 18.

As shown in FIG. 1, the light sensor subsystem 12 includes a sensor mechanism 22 that senses the luminous intensity, indicated generally at 24, of the image 18 projected on the screen 20. The sensor mechanism is preferably a conventional charge coupled device (CCD) camera having an M×N array of light sensitive elements. The CCD camera preferably has an associated clocking rate at which the light intensity of specific portions of the image is sensed. However, it should be understood that the light sensor subsystem 12 may be any other device, which is capable of sensing the light intensity of the projected image 18 and processing the light intensity data in a manner germane to operation of the system 10.

Referring to FIG. 1A, the CCD camera 22 is coupled to camera circuitry 25 through a signal conditioner and digitizer 27. The signal conditioner and digitizer 27 conditions and digitizes the camera output before the output is stored in an image memory 28. Camera gain and offset memories 29, 30 are connected to the signal conditioner and digitizer to synchronize gain and provide DC offset, respectively, to the camera output signal. The image memory 28 stores the digitized image picture data clocked out from the CCD camera 22, which consists of M×N pixels, with each pixel represented by an 8-bit number corresponding to the brightness of the screen 20 at a particular point. The image memory 28 is also coupled to the CPU 44 via the CPU data bus 32. The CPU 44 is programmed to control operation of the sensor device 12 via the methodology of the present invention, which will be described in more detail below.

The image memory 28 is also connected to an address multiplexer 33. The address multiplexer effectively operates as a driver that sequentializes and reads data stored in the image memory 28 as the CCD camera 22 inputs data into the memory. The address multiplexer 33 formats data in the image memory 28, thereby facilitating reading data from and writing of data to the image memory 28 by the CPU 30. The address multiplexer 33 is coupled to the CPU through READ line 34, and to an address generator 36 through WRITE line 37. As one address is associated with each particular image pixel, the address generator 36 calls up a particular stored pixel or writes in particular pixel data to/from the image memory 28 according to commands received from a camera control 40.

The camera control 40 is preferably formed from several drivers that control the function of the motorized aperture of the CCD camera 22. The drivers increase the dynamic range of the CCD camera, as the camera typically does not have a large enough dynamic range to process high variance signals. A large variation generally does exist in the signal levels of the sensed image. For example, from a low level blue to a high level green signal, variations in image intensity as high as 400:1 may exist. The camera control 40 operates to change the exposure time and/or aperture of the CCD camera 22 to facilitate processing of such a dynamic signal. By allowing more light into the camera or exposing the sensed image to the CCD array for a longer time, the sensor receives a more intense sensed image signal.

The sensor subsystem 12 may be a self-contained device separate from the projector circuitry 14 and projector lens assembly 16. Alternatively, the sensor subsystem 12 may be incorporated into the projector circuitry 14 and projector lens assembly 16 to form a self-contained projector unit.

Referring again to FIG. 1, the projector circuitry 14 will now be described in detail. The circuitry includes a video test generator 42, which is preferably an onboard circuit that generates a test pattern for projection through the projection lens configuration 16. The test scene is programmed in the video test generator during projector assembly and set-up as described below in more detail. The video test generator is coupled to the system CPU 44 and associated digital signal processor (DSP) 45 via CPU data bus 46. The DSP 45 in turn is connected to EPROM 47, which is programmed with the automatic shading routine of the present invention. The video test generator 42 is also coupled to a video multiplexer 50 that receives video signals from an external source 52. The video multiplexer 50 effectively acts as a switch to switch in a signal either from the video test generator 42 or from the external source 52 according to instructions received from a projector CPU 44.

The video test generator 42 is also coupled through CPU data bus 46 to a gain memory 54 and an offset memory 56. The gain memory 54 synchronizes gain on the video signal switched in by the video multiplexer 50, thereby effectively amplifying the video signal. A video amplifier 58 is therefore constantly reprogrammed as the beam projected by the projection lens configuration 16, whose amplitude is dependent upon the amount of light needed as detected by the light sensor subsystem 12, is swept across the screen 20.

The offset memory 56 is similar to the gain memory 54, but provides a DC offset to the video signal output through the projection lens configuration 16. Both the gain memory 54 and the offset memory 56 produce outputs that are input into digital to analog controllers (DACs) 60. The DACs 60 are voltage controlled amplifiers that effectively change the gain and offset, respectively, of the signals input from the gain memory and the offset memory.

The projector control circuitry 14 also includes an address multiplexer 61 that switches in commands either from the CPU 44 via address bus 62 or from the video address generator 64, depending upon the mode of operation of the projector. Data can be input into the projector via interface 84, which is connected to the CPU 44 and which is preferably an RS-232 interface.

FIG. 1 also illustrates the components of the projection lens configuration 16. The configuration 16 includes a video amplifier that amplifies the signal output from the DACs 60 to a voltage level suitable for input into a cathode ray tube (CRT) 72. The CRT 72 receives the amplified video signal from the video amp 58 and outputs the signal through a lens 74. The lens 74 focuses the image output through the CRT onto a light valve 76. The light valve generates three primary color images (red, green and blue) and projects the color images through a projector lens 78 onto the screen 20. The projection lens, or lenses, is/are arranged about an optical axis that typically passes through the composite image displayed on the screen. The light valve 76 typically comprises three separate light valves each projecting one of the three primary color images. However, the light valve may be a single light valve having three separate portions separated through a prism 82 as is well known in the art.

It should be appreciated that the above described system is preferably a Hughes-JVC Projector Model 320, 340 or 360. The projector used in the present system may be one of these commercially available models, with the addition of the sensor device 12 installed either within the existing projector or assembled separately and operatively coupled to the projector. It should also be appreciated that the system according to the present invention may be utilized with any existing LCLV projector, as well as any other projector system that projects an image onto a display screen and that requires image shading correction.

Referring to FIG. 2, a flow diagram illustrating the overall methodology associated with the automatic set-up routine of the video projector system is shown generally at 100. As will be described, the automatic set-up routine, which includes the automatic shading process according to the present invention, is a software routine. Preferably, the software is loaded into the projector EPROM. Specific set-up parameters are then entered via personal computer, which may be connected to the projector during the projector set-up routine through the RS-232 interface 84. It is contemplated that the set-up routine need only be performed once for each projector as long as the camera associated with the projector stays the same. It may be necessary to recalibrate the projector if the camera is changed or, if the camera is housed separately from the projector, the camera position changes.

Referring to FIG. 2, the projector automatic set-up routine begins at 102, with calibration of the camera. The step allows the camera to implement its automatic process of finding the correct aperture and exposure time for a particular light source. At 104, the camera is aimed and focused to match the camera and the projector fields of view. At 106, the projector light level is center balanced. This step enables the projector operator to determine desired brightness, color and greyscale characteristics through analysis of certain screen test points. Although this step is not necessary for the automatic shading routine of the present invention, such parameter settings are desirable. At 108, the area of the image projected by the projector is mapped. This routine generates a grid of 32×32 shading correction application points (SCAPs), which are then utilized to measure the intrinsic brightness profile of the screen. At 110, the image area is then shaded according to the shading process of the present invention.

Referring to FIGS. 3–8, the projector set-up described in conjunction with steps 102–110 will be further described. FIG. 3 summarizes at 120 the methodology involved in calibrating the camera. At 122, the projector operator removes the camera lens 78 and, in its place, installs a calibration tube (not shown). Preferably, the calibration tube includes a light emitting diode (LED), or other flat source of light, as its operative component. At 124, the dark state of the camera output is adjusted to match the zero level of the A-D converter. Preferably, this step is performed by an automatic subtraction circuit associated with the set-up software that matches the camera swing, or output, to the camera input. At 126, the camera output is adjusted so that the maximum camera output matches the maximum input of the A-D converter. Together, steps 122, 124 and 126 fill both the projector gain memory 54 and the offset memory 56 so that each camera pixel responds identically to each particular light source. At step 128, once steps 124 and 126 are performed, the projector operator removes the calibration tube and reinstalls the camera lens.

Figures 4, 5:
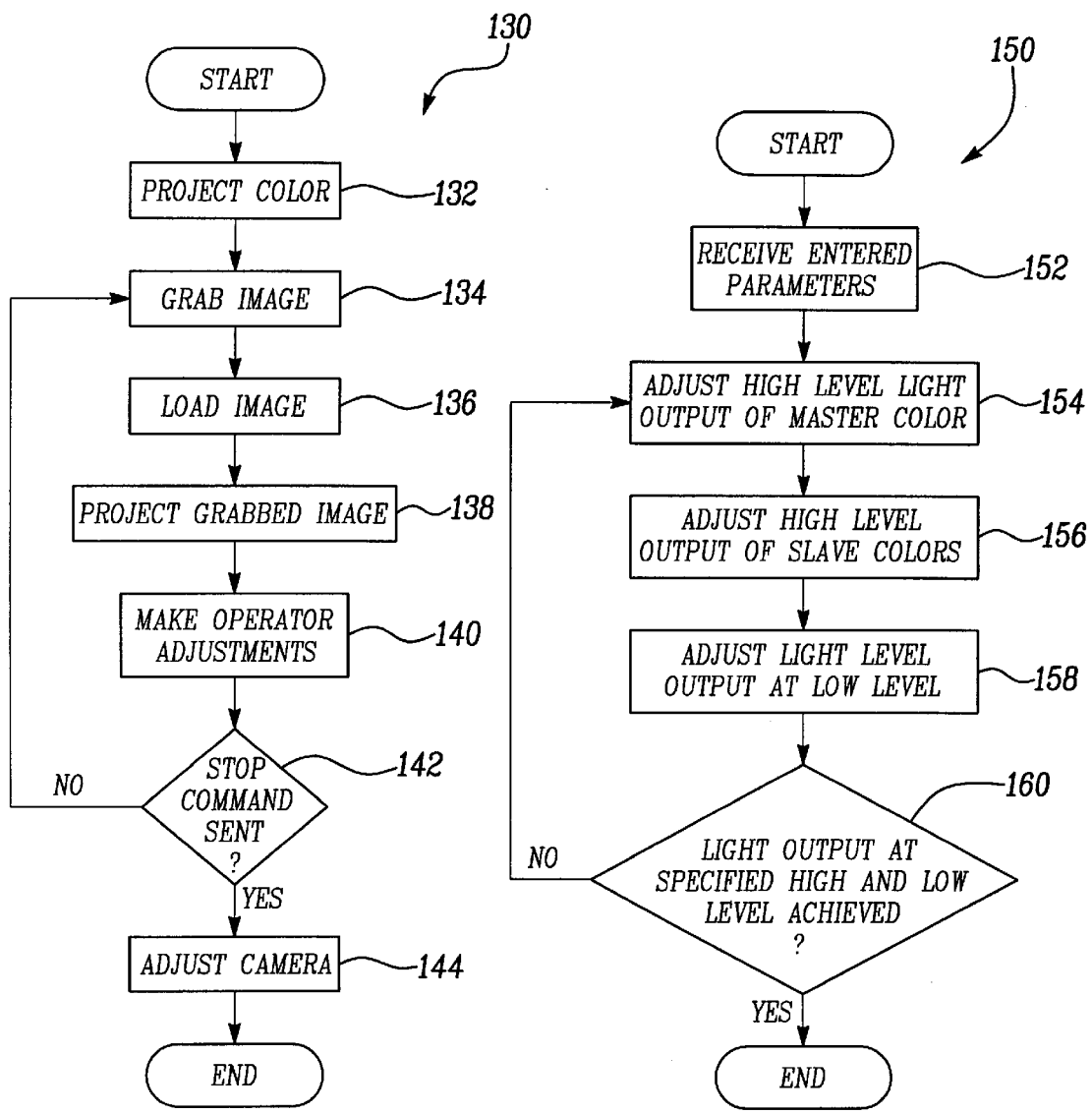
FIG. 4 is a flow diagram of the methodology associated with a camera aim and focus routine associated with the projector.
FIG. 5 is a flow diagram of the methodology associated with center balancing the light level of the video projector.

FIG. 4 illustrates the methodology associated with the camera aim and focus process discussed above at 130. Once the camera is calibrated, the projector operator projects a single color flat field test pattern onto the projection screen at 132. Preferably, the color used for the flat field test pattern is green. However, either blue or red could also be utilized in this routine. The green light forms a flat field, with the same light output being associated with each test point on the screen. The routine next grabs an image of the flat field test pattern at 134, and then loads the image into the test pattern generator 42, at 136. This step allows the processor running the aim and focus routine to generate a picture of the pattern detected by the camera 22, with the detected image not being a flat image as originally projected. At 138, the software projects the image pattern detected by the camera at 136. At 140, the operator adjusts the camera to achieve optimal camera and alignment focus in alignment for the camera with respect to the flat field image within the camera field of view. At 142, if the operator does not send a stop command, steps 132–140 are repeated until the operator determines that optimal focus and camera alignment have been achieved at 144.

FIG. 5 is a flow diagram 150 summarizing the methodology associated with center balancing of the projector light level at 152. During operation of the projector set-up software, a menu is automatically generated that allows the projector operator to enter default image parameters for the amount of blue light projected, as well as relative amounts of red light in reference to the blue light, and green light in reference to the blue light. Alternatively, red or green could be used as the reference colors. As shown at 153 in FIG. 5A, these menu parameters allow the projector set-up operator to set the desired color of white associated with projected images.

Referring again to FIG. 5, at 154, the routine adjusts projector light output at a specified high level of blue, typically 100%, based on brightness and image speed requirements. The light output is adjusted according to how hard the operator wishes to drive the imaging color of the projector. For instance, if a golf tournament was to be projected onto a screen through the projector, less brightness and more speed would be desired, so that a golf ball could be followed without the golf ball having a tail associated with its flight path. At 156, the routine adjusts the high level red and green light, based on color temperature requirements. Preferably, this step is performed through adjustment of video gain and depends upon the data entered by the operator at 152. Preferably, 80 IRE is utilized as the high level for red and green light. However, this level may vary according to individual image projection requirements and needs.

Figures 5A, 5B:
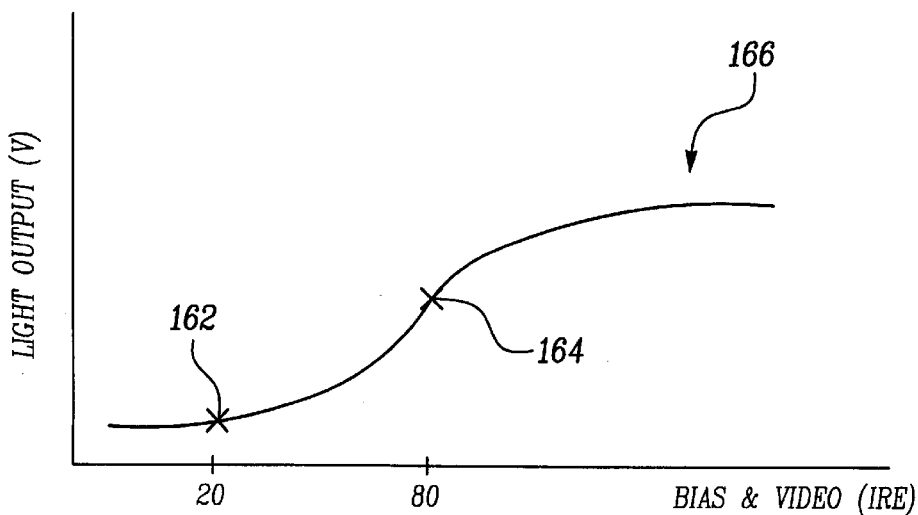
FIG. 5A is a menu of operation input default image parameters entered during projector set-up.
FIG. 5B is a graph of projector light output versus input AC bias and video signal.

At 158, the routine adjusts light output at a specified low level for each color based on contrast, color temperature, and gamma curve requirements. Preferably, the specified low level is 20 IRE, but may vary according to individual applications. The light output at the specified low level is adjusted using video offset control and/or G2, with G2 being a DC bias that turns on the CRT without a video signal and which is not software controllable. At 160, the routine determines if the maximum light output at the specified high/low levels is simultaneously achieved. If not, the routine returns to 154, and the gain and offset for each color are reset at the specified high/low levels, until the maximum light output at the specified high/low levels is simultaneously achieved. As shown in FIG. 5B the specified high/low levels are shown at 162 and 164, respectively, along the graph of light output by the projector versus input AC bias and video signal, at 166.

Figure 6A:
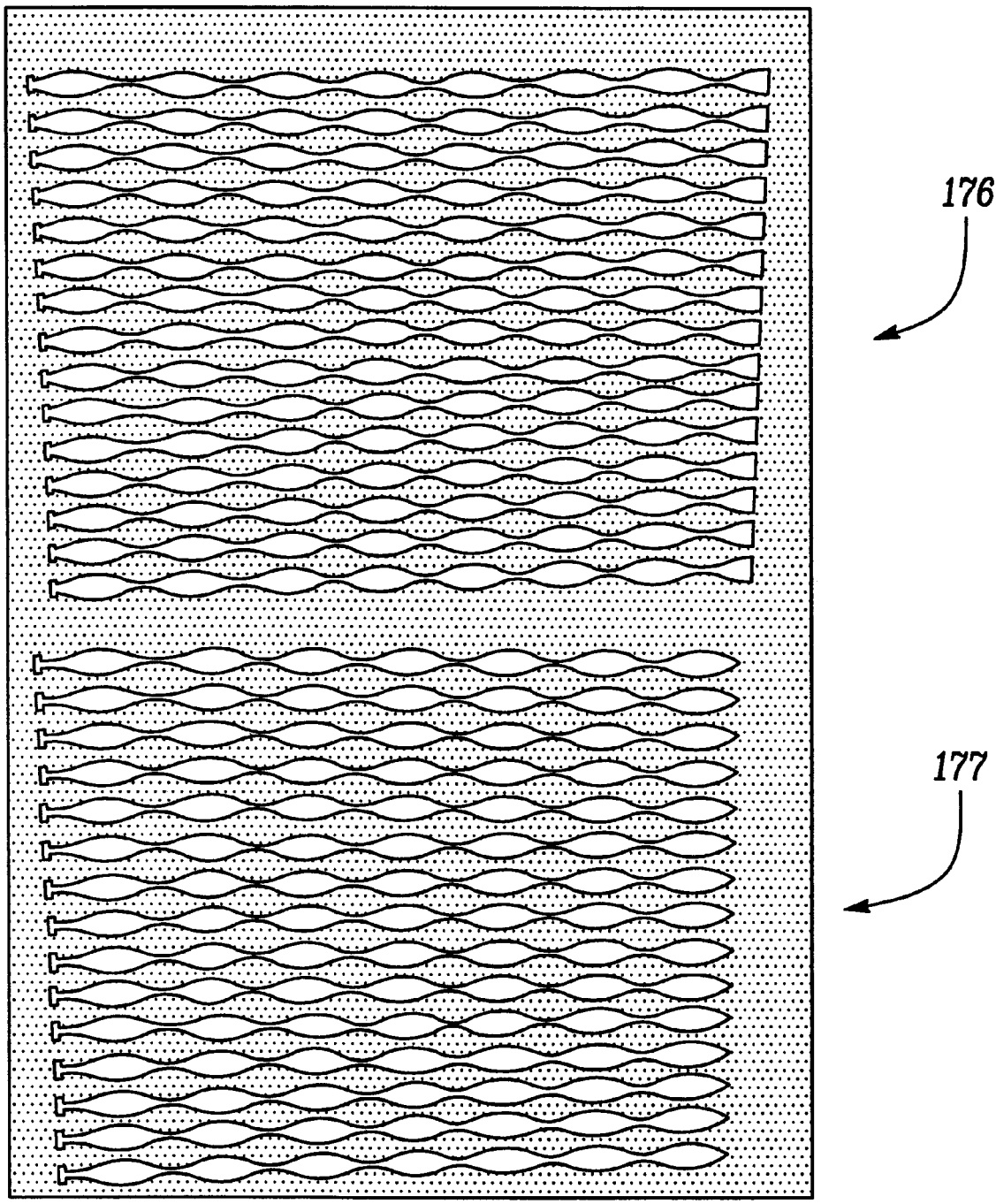
FIG. 6A illustrates sample grids of projected test patterns utilized to implement the shading routine of the present invention.

FIG. 6 illustrates the methodology at 170 associated with mapping of an image area on the projected image. At 172, the routine projects a series of bright spots at shading correction application points (SCAPs) selected by the software routine as being representative of the image field, and inserts shading correction data on a flat background. The bright spots are preferably projected in a 32×32 grid format. FIG. 6A illustrates a sample portion of the images projected by the projector via the DSP at 174 and 176. The projected bright spots appear as chevrons in the projected test patterns. The patterns of bright spots are preferably generated in the following patterns: even columns, even rows; odd columns, odd rows; odd columns, even rows; and even columns, odd rows. At 178, the routine causes the camera to grab an image of each of the above described test patterns. The routine then searches for the brightest portion of each of the test pattern bright spots. This center of brightness then becomes the center of correction, and the spot of brightness measurement, for that particular pattern spot. The camera pixels associated with the center of each of the selected bright spots are then identified and stored in memory.

At 180, the routine determines if all the SCAPs have been determined. If not, the routine returns to step 172, and steps 172 and 178 are repeated. If all SCAPs have been determined, the routine advances to 182, and generates a final map of all SCAPs onto the camera pixels corresponding to each portion on the 32×32 grid. At 184, the routine implements an edge shaving subroutine method to establish a perimeter within which all light measurements are uncropped by the image edges. If a given pixel on the 32×32 grid is not completely within the boundaries of the screen, the routine dispenses of the pixel and extrapolates data from neighboring points on the grid to establish an SCAP for that point. At 186, the routine measures the intrinsic brightness profile of the screen, which is the profile that exists with perfect light value response uniformity. Preferably, for a light valve projector, this step is carried out through use of a projector green light valve (not shown). A map of the measured profile is then stored at the DSP for later use in the auto shading routine.

FIG. 7 is a flow diagram 190 that illustrates the methodology associated with measuring the intrinsic brightness profile of the screen discussed above at 186. At 192, the routine sets the video output level on a selected color, such as green, to 100%. At 194, the routine measures the brightness at each SCAP. At 196, the routine determines if the current projector bias setting provides maximum light output at each particular SCAP. If maximum light output is not provided at 198, the routine increases the projector bias setting and returns to step 194 to again measure the brightness at each SCAP. If the maximum light output is provided in each SCAP, the routine proceeds to 199, and normalizes peak brightness measurements at all SCAPs. This step is performed by setting the brightness at the center of each SCAP to a normalized value of 1, with the brightness rolling off proportionally from the center point of brightness.

Figures 8A, 8B:
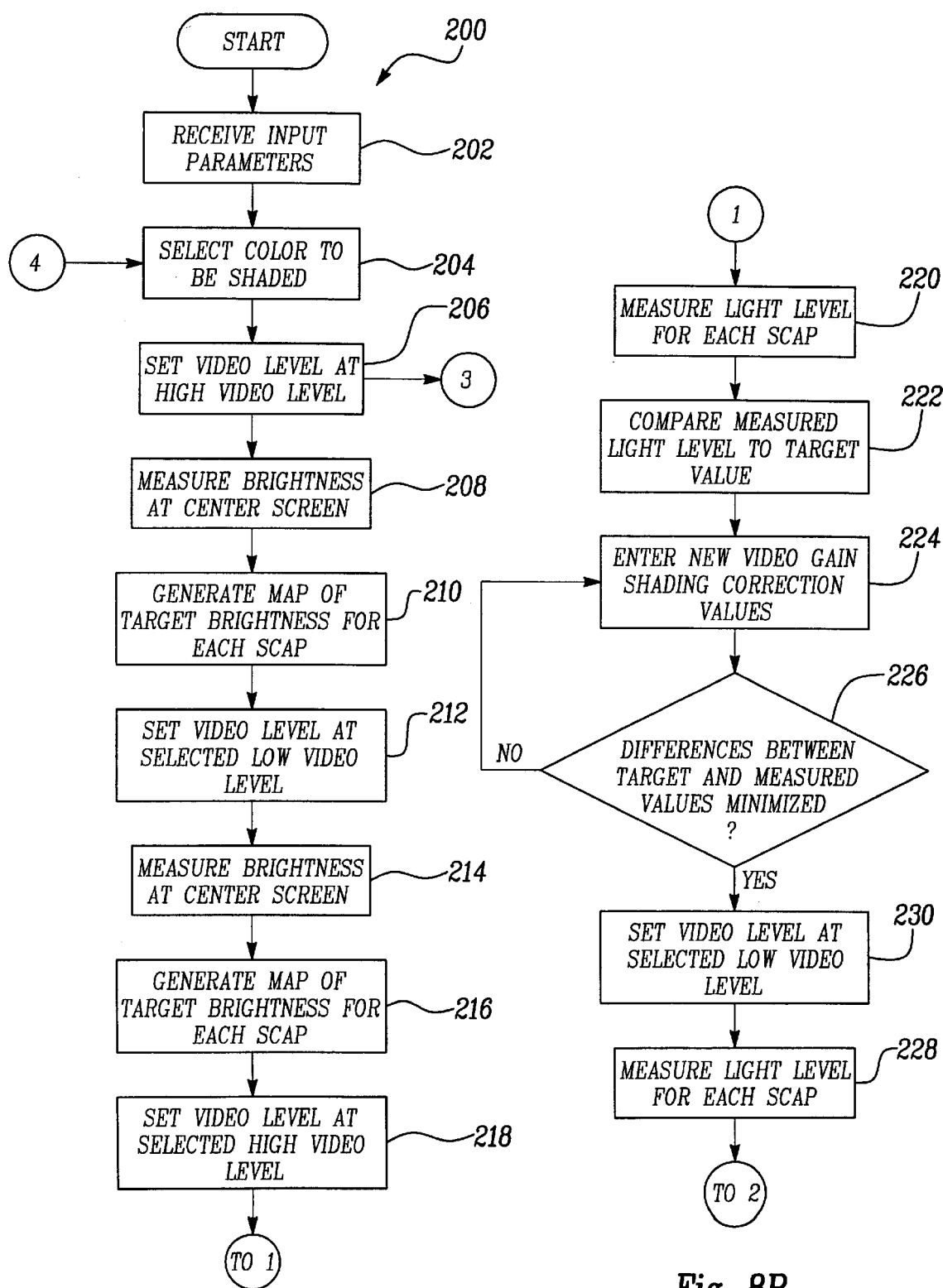
FIGS. 8A–8C are flow diagrams illustrating the methodology of the automatic shading process according to a preferred embodiment of the present invention.
Figure 8C:
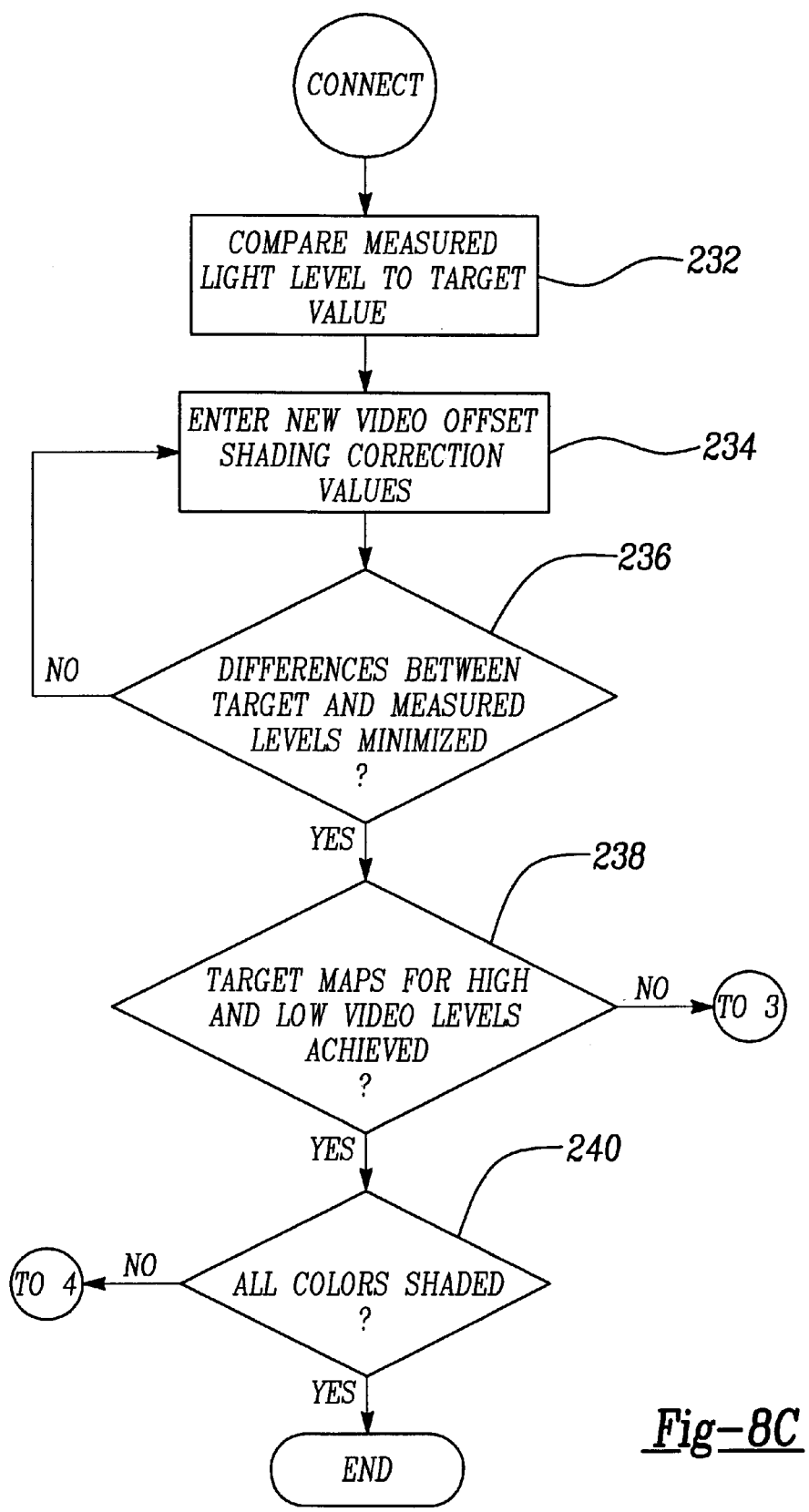

FIGS. 8A–8C illustrate the methodology associated with the automatic shading routine of the present invention at 200. At 202, the projector set-up operator enters desired shading parameters through the projector interface. Preferably, the default parameters entered above in association with mapping of the image area are all that are required at this point. These parameters allow projector roll-off to be tailored to how strong it is desired to run the auto shading routine.

Under ideal conditions, the ILA (light valve) and CRT's would have perfectly uniform response and radiance respectively. This however does not imply perfectly uniform brightness to the viewer because of other system nonuniformities. The arc lamp illumination of the ILA for example is normally 2 to 4 times more intense at the center of the ILA than at the corners. Very often, the viewing screen has gain. This means that brightness of the light emanating from a point on the screen varies with the viewing angle. Typically, the shading process should not attempt change the intrinsic rolloff of the screen brightness but instead to reproduce the intrinsic rolloff with non ideal components by appropriately modifying the signal. In some cases however, it is acceptable to modify the rolloff in order to optimize another image parameter. For example, consider a case in which the intrinsic rolloff from center to corner is 1.5 to 1 (the center is 50% brighter than the corners) and in which the sensitivity of the ILA in the corners is 50% of the sensitivity in the center. In order to reproduce the intrinsic rolloff the shading would drive the CRT twice as hard in the corners as in the center. The excess drive in the corners could potentially result in loss of CRT resolution there. The operator could instead create a rolloff of 3 to 1 thereby requiring the same CRT drive level in the corners as at center. It should be noted that the center screen target brightness is always maintained when modified rolloff is entered.

At 204, the color to be shaded is selected. Once the color is selected at 204, the video level is set at 206 at the selected high video level which, as described above, is preferably 80 IRE. At 208, brightness at the center of the projection screen is measured. Subsequently, at 210, a map of target brightness for each SCAP is generated. For each SCAP, the target brightness value is the product of the center screen brightness and the normalized SCAP value found during the mapping of the image area as described above in connection with FIGS. 6 and 7.

At 212, video level is again set at the selected low video level, which is preferably 20 IRE. Brightness is then measured at the center of the screen at 214. At 216 a map of target brightness for each SCAP is then generated. As with the selected high video level, target brightness value for each SCAP is the product of the center screen brightness and the normalized SCAP value found in the mapping. The brightness at the center screen is also measured for the low video level, because roll off may not be the same at the low level as at the high level due to differences in projector optics polarizing due to inherent physical characteristics of the light valves, a discussion of which is beyond the scope of this invention.

At 218, the video level is set at the selected high video level. Subsequently, at 220, the light level is measured for each SCAP at the selected high video level. At 222, the routine compares the measured light level to the target value for each SCAP. The routine then enters new video gain shading correction values that reduce the differences between the target values and the measured values at 224. At 226, the routine determines if the differences between the target measured values is minimized, preferably below a predetermined minimal value. If the differences have not been minimized, the routine returns to step 224, and new gain shading correction values are automatically entered by the software. If the differences have been minimized, the routine proceeds to 228, where the video level is set at the selected low video level.

Figure 9:
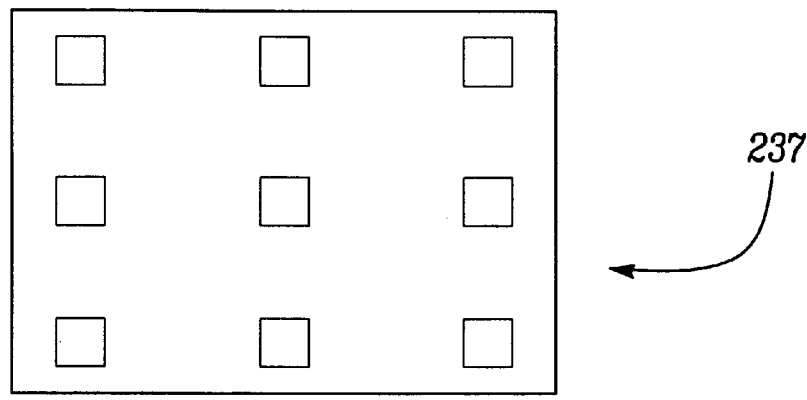
FIG. 9 is a matrix generated by a data output device that visually displays the progress of the shading process of the present invention during operation of the process.

At step 230, the light levels for each SCAP are measured at the selected low video level. At 232, the measured light level is compared to the target value for each SCAP. At 234, the software enters new video offset shading correction values which reduce the differences between the target values and the measured values. At 236, the routine determines if the differences between target and measured values is minimized. If the differences are not minimized, routine returns to 234, and new offset shading correction values are entered until it is determined that the differences between the target and measured values is minimized. As shown in FIG. 9, the CPU stores the target value, the measured value, and correction data, as indicated generally at 237 in the 9 representative SCAPS displayed during the correction process. These values are redisplayed on the data output device. Each iteration of the process updates the projector operator as to the progress of the auto shading. Thus, steps 220–236 adjust output light levels so that measured values for each light spot in the test pattern shown in FIG. 7A is adjusted to be more germane to adjacent test spots, thereby creating a transition between the spots that is unnoticeable and visually pleasing to the eye.

At 238, the routine determines if the target maps for high and low video levels have been achieved. If the target map has not been achieved, the routine returns to 206, and the shading procedure is repeated. If the target maps have been achieved, the routine proceeds to 240, where it determines if all test colors (red, green and blue), have been shaded. If all colors have not been shaded, the routine returns to 204, and a subsequent color is shaded.

Figure 10:
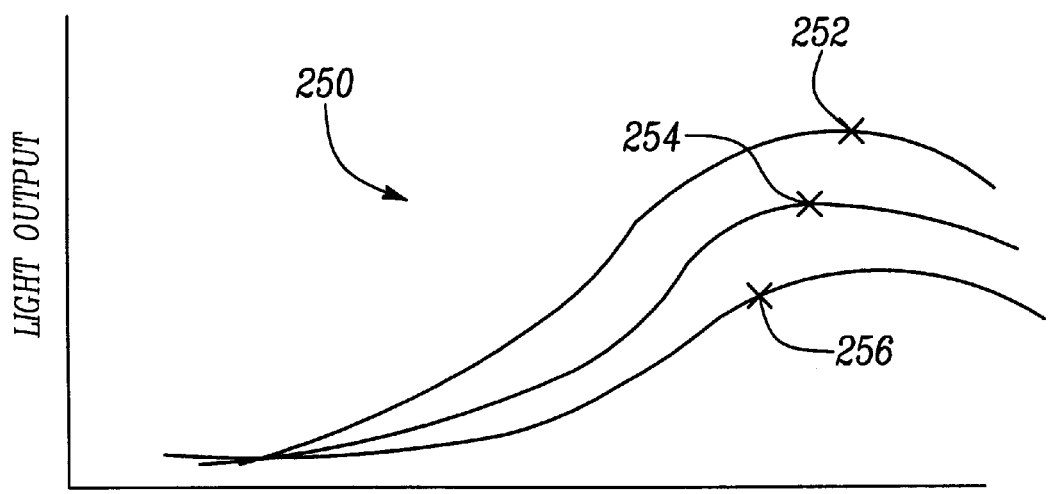
FIG. 10 is a sample graph of light input versus light output for three different points on a projector light valve.

Referring to FIG. 10, a graph of input light versus output light for each test point on the test screen, corresponding to a point on the light valve itself, is shown at 250. Each point on the light valve typically has a varying point at which its illumination input versus output ratio is at a maximum. The automatic shading process of the present invention allows the projector to have a flat input/output response, thereby allowing maximum light to be output through the light valve, such as at peaks 252, 254 and 256, respectively.

Upon reading of the above description, it should be appreciated that the automatic shading routine of the present invention represents an improvement in the image projector art, as it presents an objective method of correcting image light intensity variations. The present invention thereby replaces the conventional subjective shading methods that are both laborious and time-consuming. The present invention also simplifies the shading process, thereby reducing the requisite skill level required to run the routine.

It is understood that the above described embodiments are merely illustrative of the possible specific embodiments which can represent applications of the principle of the present invention. Other arrangements may be readily devised in accordance with these principles by one of ordinary skill in the art without departing from the scope and spirit of the present invention.

What is claimed is:

1. A video projector that receives and processes video signals and projects an image corresponding to the processed signals, the video projector automatically correcting for errors in light amplification and sensitivity variations in a liquid crystal light valve using a shading system, the video projector comprising:
   a projector lens;
   a plurality of video signal amplifiers that amplify a video signal prior to the video signal being output as a projected image through the lens;
   a light intensity measurement device for sensing the brightness of the projected image and generating an image brightness signal in response to the sensed brightness, the light intensity measurement device including signal conditioning circuitry for digitizing the image brightness signal and storing the image brightness signal in an image memory; and
   a processor coupled to the light intensity measurement device, the processor generating light intensity maps based on the image brightness signal and storing the light intensity maps in a digital memory for use by the shading system, and the processor receiving the digitized image brightness signal, comparing the digitized image brightness signal to the light intensity maps stored in memory, and automatically adjusting the plurality of video signal amplifiers to compensate for variations in luminance in the projected image by producing correction maps that are stored in an associated memory.

2. The video projector of claim 1, wherein the processor includes a plurality of light intensity maps stored in a memory, the plurality of intensity maps being projected in a test pattern and sensed by the light intensity measurement device for image shading correction purposes.

3. The video projector of claim 2, further comprising a plurality of correction maps generated by the processor from the plurality of light intensity maps and stored in the memory, the correction maps being read by the processor from the memory to produce image correction signals in response to the projected image.

4. The video projector of claim 1, wherein the projector lens comprises a fixed lens.

5. The video projector of claim 1, wherein the projection lens comprises a manual zoom lens.

6. The video projector of claim 1, wherein the light intensity measurement device comprises a light sensitive charge coupled device (CCD) array.

7. The video projector of claim 6, wherein the CCD array comprises an array of individual transducers that each output an electrical signal whose strength is directly proportional to sensed light intensity.

8. The video projector of claim 1, wherein the light intensity measurement device is calibrated for use as a linear light measurement transducer.

9. The video projector of claim 1, wherein the light intensity measurement device is implemented within the video projector.

10. The video projector of claim 1, wherein the light intensity measurement device is implemented separately from the video projector.

11. A method of automatically correcting for errors in light amplification and sensitivity variations in a liquid crystal light valve using a shading system, comprising the steps of:
   sensing light intensity of a projected video signal;
   producing light intensity maps which are stored in a digital memory;
   projecting the light intensity maps in a test pattern to initiate production of error signals;
   generating a grid of N×M shading correction application points (SCAPs) which are used to measure a video screen intrinsic brightness profile representing portions of the light intensity maps having excess luminous intensity;
   executing an edge shaving subroutine for establishing a perimeter within which all light measurements are measured;
   extrapolating data from adjacent points on the grid of N×M SCAPs for fine tuning the SCAP points;
   inserting shading correction data through production of error correction maps which are stored in an associated memory, said error correction maps compensating for image errors caused by the excess luminous intensity; and
   reading the stored error correction maps and producing image correction signals.

12. The method of claim 11, wherein the step of sensing portions of the projected test pattern image comprises the steps of:
   sensing light intensity in a plurality of flat field images; and
   producing a plurality of light intensity maps, corresponding to light intensity sensed in the plurality of flat field images, for correction of image light intensity errors.

13. The method of claim 12, further comprising the steps of:

generating a plurality of light intensity correction maps from the plurality of light intensity maps;

storing the plurality of light intensity correction maps; and producing correction signals from said plurality of light intensity correction maps that are applied to output images.

14. The method of claim 13, wherein the step of producing correction signals further comprises the steps of:

A) measuring center screen brightness for a selected video output level;

B) generating a target brightness map for each of a plurality of shading correction application points;

C) measuring an actual brightness level for each of the plurality of shading correction application points at the selected video output level;

D) comparing the measured actual brightness level at each of the plurality of shading correction application points to a target brightness level; and E) minimizing differences between the measured actual brightness level and the target brightness level at each of the plurality of shading correction application points.

15. The method of claim 14, wherein steps A)–E) are repeated for a second video output level.

16. The method of claim 14, wherein steps A)–E) are repeated until differences between target values and measured values for both selected values are simultaneously achieved.

17. The method of claim 14, wherein steps A)–E) are repeated for a second color.

18. A method of automatically shading images projected by an image projector, comprising the steps of:

selecting a color to be shaded;

setting a projector video level at a selected high projector light output level using a shading subroutine that adjusts video gain dependent upon data entered from an external source;

generating target brightness map for a plurality of preselected shading correction application points at the high projector light output level;

setting the projector video level at a selected low projector light output level using a shading subroutine that adjusts video gain dependent upon data entered from an external source;

generating a target brightness map for the plurality of shading correction application points at the low projector light output level;

measuring a brightness level at both the high and low video levels for each of the plurality of shading correction application points; and correcting differences between the target brightness level and the measured brightness level for each of the plurality of shading correction application points.

19. The method of claim 18, wherein the step of generating a target brightness map for the plurality of shading correction application points at the selected high video level comprises the steps of:

generating a map of all shading correction application points onto corresponding camera pixels;

measuring an intrinsic brightness profile of the video projection screen to normalize brightness measurements at the plurality of shading correction application points to a peak brightness at the center of the screen;

measuring brightness at the center of the screen at the selected high video level; and multiplying the center screen brightness at the selected high video level and the normalized peak brightness level for the plurality of shading correction application points to generate a map of target brightness for the plurality of shading correction application points.

20. The method of claim 19, wherein the step of generating a target brightness map for the plurality of shading correction application points at the selected low video level comprises the steps of:

generating a map of all shading correction application points onto corresponding camera pixels;

measuring an intrinsic brightness profile of the video projection screen to normalize brightness measurements at the plurality of shading correction application points to a peak brightness at the center of the screen;

measuring brightness at the center screen at the selected low video level; and multiplying the center screen brightness at the selected low video level and the normalized peak brightness levels for the plurality of shading correction application points to generate a map of target brightness for the plurality of shading correction application points.

21. The method of claim 18, further comprising the steps of, prior to the step of setting the projector video level at the selected high video level:

grabbing an image of a flat field test pattern;

storing the image of the flat field test pattern;

projecting the stored image of the flat field test pattern; and focusing the camera, and adjusting camera position, to align the stored image of the flat field test pattern within the camera field of view.

* * * * *